US012485762B2

(12) United States Patent
Kinugawa et al.

(10) Patent No.: US 12,485,762 B2
(45) Date of Patent: Dec. 2, 2025

(54) WORKING MACHINE

(71) Applicant: Kubota Corporation, Osaka (JP)

(72) Inventors: Ryosuke Kinugawa, Sakai (JP); Ryo Ikeda, Sakai (JP); Keisuke Miura, Sakai (JP); Kenji Ishihara, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/983,534

(22) Filed: Dec. 17, 2024

(65) Prior Publication Data

US 2025/0115130 A1 Apr. 10, 2025

Related U.S. Application Data

(63) Continuation of application No. PCT/JP2023/021271, filed on Jun. 7, 2023.

(30) Foreign Application Priority Data

Jun. 30, 2022 (JP) ................. 2022-105610

(51) Int. Cl.
*B60L 1/00* (2006.01)
*A01B 61/02* (2006.01)

(52) U.S. Cl.
CPC ............ *B60L 1/003* (2013.01); *A01B 61/025* (2013.01); *B60L 2200/40* (2013.01)

(58) Field of Classification Search
CPC ...... B60L 1/003; B60L 2200/40; A01B 59/00; A01B 61/02; B60K 1/04
See application file for complete search history.

(56) References Cited

U.S. PATENT DOCUMENTS

| 8,978,851 B2* | 3/2015 | Tojima | E02F 9/2016 |
| | | | 191/12.2 A |
| 9,290,093 B2* | 3/2016 | Turner | B60K 1/04 |
| 9,592,742 B1 | 3/2017 | Sosinov et al. | |
| 11,283,381 B2* | 3/2022 | Kawane | A01C 19/02 |

(Continued)

FOREIGN PATENT DOCUMENTS

| JP | 2004364426 A | 12/2004 |
| JP | 2008069516 A | 3/2008 |
| JP | 2019187375 A | 10/2019 |

OTHER PUBLICATIONS

International Search Report in PCT/JP2023/021271, mailed Jul. 25, 2023, 4 pages.

(Continued)

*Primary Examiner* — Paul N Dickson
*Assistant Examiner* — Tiffany L Webb
(74) *Attorney, Agent, or Firm* — Keating & Bennett, LLP (57) ABSTRACT

A working machine includes a traveling vehicle that is a first moving entity, a working device that is a second moving entity coupled to the first moving entity, and a sub battery loaded on the second moving entity to store an energy source to drive the traveling vehicle. Therefore, it is not necessary to newly provide a configuration to load the sub battery on the traveling vehicle, and a battery can be easily loaded. In a case where the traveling vehicle includes a main battery, the traveling and work can be continued according to a capacity of the sub battery without being stopped in order to charge the main battery that has a decreased remaining charge level.

6 Claims, 8 Drawing Sheets

(56) References Cited

U.S. PATENT DOCUMENTS

| | | | |
|---|---|---|---|
| 11,805,723 B2 * | 11/2023 | Takaki | A01C 7/08 |
| 2012/0273285 A1 * | 11/2012 | Jensen | B60K 7/0007 |
| | | | 180/65.1 |
| 2015/0149053 A1 | 5/2015 | Turner et al. | |
| 2020/0315084 A1 | 10/2020 | Yagyu et al. | |

OTHER PUBLICATIONS

Official Communication issued in corresponding Japanese Patent Application No. 2022-105610, mailed on Jul. 1, 2025, 4 pages.

* cited by examiner

WORKING MACHINE

CROSS-REFERENCE TO RELATED APPLICATIONS

The present application is a continuation of PCT Application No. PCT/JP2023/021271, filed on Jun. 7, 2023, which claims the benefit of Japanese patent application No. 2022-105610 filed on Jun. 30, 2022, the entire contents of each application being incorporated herein by reference in their entirety.

BACKGROUND OF THE INVENTION

1. Field of the Invention

The present invention relates to working machines including, for example, agricultural machines and construction machines.

2. Description of the Related Art

Hitherto, a working machine of JP-A 2019-187375 is known as a working machine such as an agricultural machine. The working machine of JP-A 2019-187375 includes a working device coupled to a traveling vehicle. A prime mover that drives the traveling vehicle is an internal combustion engine such as a diesel engine.

SUMMARY OF THE INVENTION

In recent years, a trend of electrification and emission control has accelerated for working machines. As a prime mover, for example, a motor or the like may be used. In this case, a battery or the like that supplies electric energy to the prime mover is often used. In general, when stored electric energy of the battery or the like is used up, charging is required. Because charging requires stoppage of traveling and work, there is a demand to load as many batteries or the like as possible on the working machine.

Therefore, example embodiments of the present invention provide working machines each capable of appropriately loading as many energy storages or batteries as possible to reduce or minimize stoppage of traveling and work related to charging.

A working machine according to an example embodiment of the present invention includes a first moving entity, a second moving entity coupled to the first moving entity, and a storage loaded on the second moving entity to store an energy source to drive the first moving entity.

In the working machine, the second moving entity includes a working device to perform work, and the storage is loaded on the working device.

In the working machine, the second moving entity includes a working device to perform work, and the storage is coupled to the working device.

The working machine includes a supply path which is a path of the energy source supplied from the storage to the first moving entity, and a connector to connect and disconnect the supply path, allow supply of the energy source when connected, and cut off supply of the energy source when disconnected.

In the working machine, the connector is provided in the first moving entity so as to face the second moving entity coupled to the first moving entity.

In the working machine, the storage is a battery to charge and discharge electric energy as the energy source, the second moving entity includes a working device to perform work and to receive a signal from the first moving entity, and the working machine includes a communication path to transmit the signal from the first moving entity toward the working device, and a connector to connect and disconnect the supply path and the communication path, allow supply of the electric energy and transmission of the signal when connected, and cut off supply of the electric energy and transmission of the signal when disconnected.

According to example embodiments of the present invention, it is possible to appropriately load as many energy storages or batteries that store energy as possible and reduce or minimize stoppage of traveling and work related to charging.

The above other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, each example embodiment of the present invention will be described with reference to the drawings.

First Example Embodiment

Figure 1:
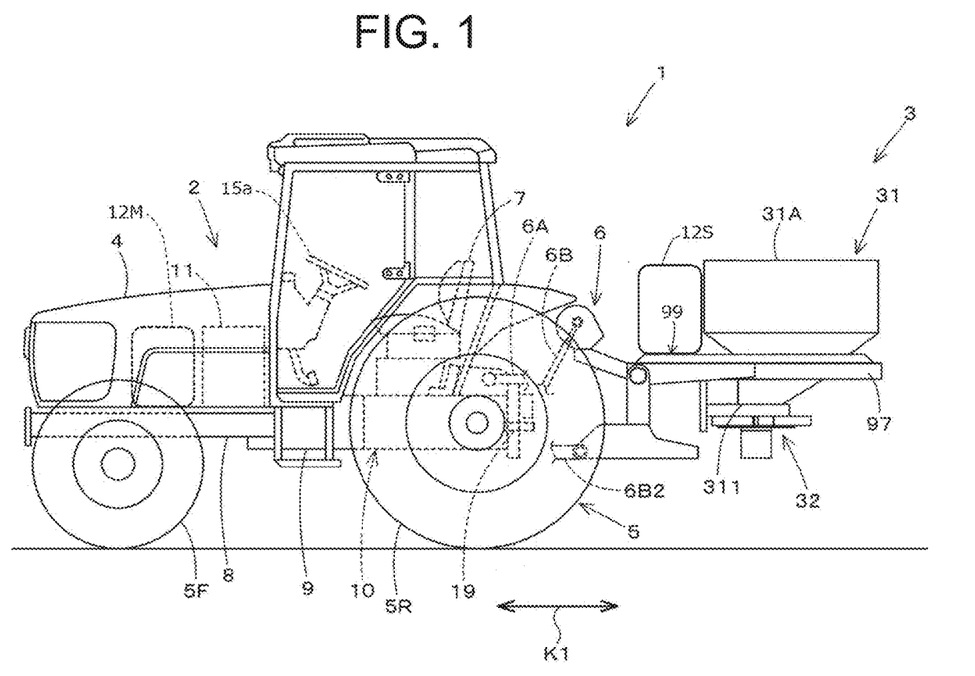
FIG. 1 is an overall view of a working machine according to a first example embodiment of the present invention.
Figure 2A:
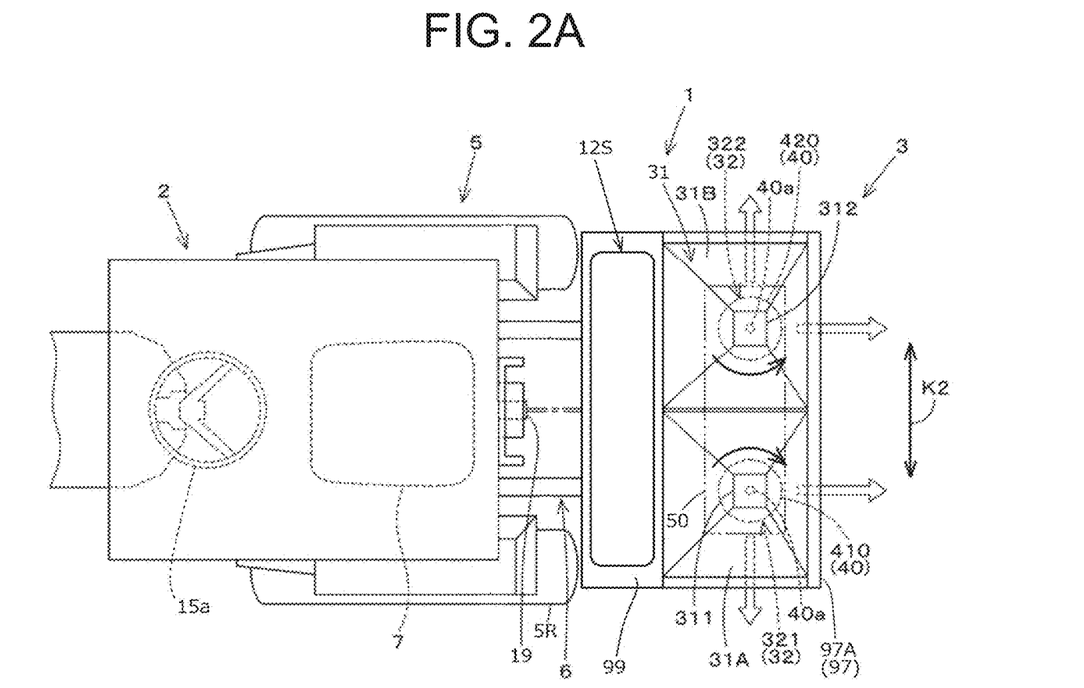
FIGS. 2A and 2B are plan views of a rear portion of the working machine shown in FIG. 1 and a rear view of a working device.
Figure 2B:
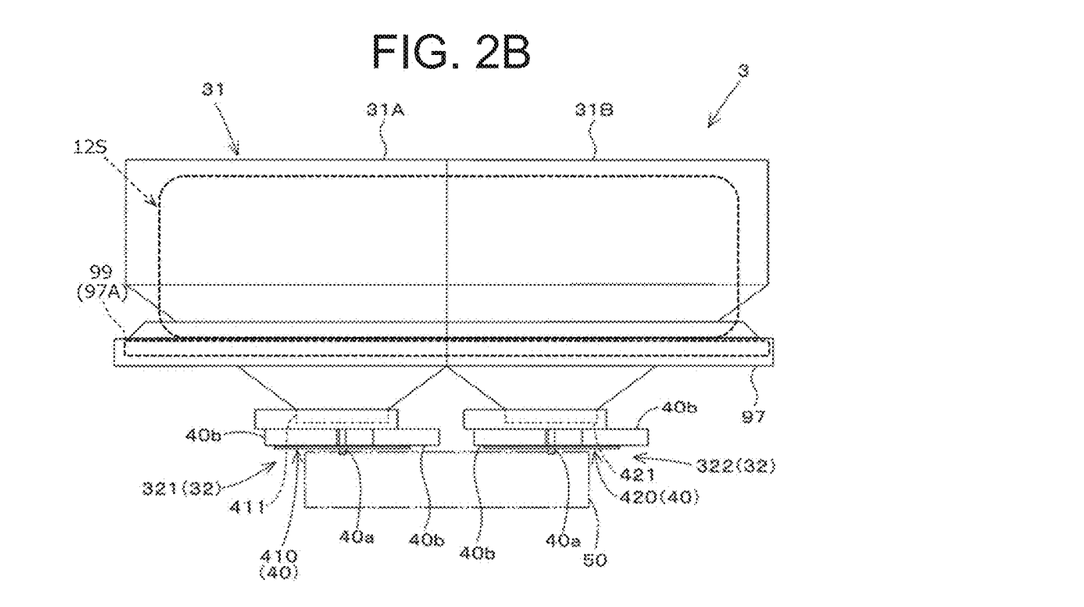

FIG. 1 is an overall side view of a working machine 1 according to a first example embodiment. FIGS. 2A and 2B show plan views of a rear portion of the working machine 1 and a rear view of a working device 3. As shown in FIGS. 1, 2A and 2B, the working machine 1 includes a traveling vehicle (first moving entity) 2 and the working device (second moving entity) 3. The working machine 1 further includes a main battery 12M and a sub battery (storage) 12S. The main battery 12M and the sub battery 12S store electric energy (energy source) to drive the traveling vehicle 2 and the working device 3. In the present example embodiment, the main battery 12M and the sub battery 12S are loaded on the traveling vehicle 2 and the working device 3, respectively.

The traveling vehicle 2 travels while towing the working device 3. In the present example embodiment, since the traveling vehicle 2 is a tractor, the traveling vehicle 2 will be described below as a tractor 2. However, the traveling vehicle 2 is not limited to the tractor, and may be an agricultural vehicle such as a combine harvester or a rice transplanter, or may be a construction vehicle or the like. In addition, the traveling vehicle 2 may be a pickup truck. The working device 3 is a device to perform work (agricultural work) on a farm field or the like. The working device 3 is an implement, an attachment, or the like coupled to the traveling vehicle 2.

The tractor 2 includes a vehicle body 4, a traveling device 5, and a coupling device 6. In the description of example embodiments of the present invention, a front side (a left side in FIG. 1) of a driver seated on a driver seat 7 loaded on the vehicle body 4 will be described as a front side, a rear side (a right side in FIG. 1) of the driver will be described as a rear side, a left side (a front side in FIG. 1) of the driver will be described as a left side, and a right side (a back side in FIG. 1) of the driver will be described as a right side. In addition, a horizontal direction K2 (see FIGS. 2A and 2B), which is a direction orthogonal to a front-rear direction K1 (see FIG. 1), will be described as a vehicle width direction.

The vehicle body 4 includes a vehicle body frame 8, a clutch housing 9, a transmission case 10, a prime mover 11, and the main battery 12M. The vehicle body frame 8 extends in the front-rear direction of the vehicle body 4. The prime mover 11 and the main battery 12M are loaded on the vehicle body frame 8. In the present example embodiment, the prime mover 11 is an electric motor. Hereinafter, it is assumed that the prime mover 11 is an electric motor 11. The electric motor 11 is driven by electric energy supplied from the main battery 12M.

The main battery 12M includes a battery pack, an electronic component (a relay, a fuse, or the like), and a cooler inside a rectangular or substantially rectangular parallelepiped casing. The battery pack includes a plurality of battery modules. The battery module includes a plurality of cells. The main battery 12M configured as described above is a battery capable of charging and discharging electric energy, specifically, a lithium ion battery. The electric energy stored in the main battery 12M is transmitted to a main power supply path P1 described below.

The electric motor 11 and the main battery 12M are loaded on the vehicle body frame 8 and disposed at a front portion of the vehicle body 4. The clutch housing 9 is connected to a rear portion of the electric motor 11 and houses a clutch. The transmission case 10 is coupled to a rear portion of the clutch housing 9 and extends rearward. The transmission case 10 houses a transmission device 13, a rear wheel differential device 14, and the like described below. The traveling device 5 includes a front wheel 5F provided at the front portion of the vehicle body 4 and a rear wheel 5R provided at the rear portion of the vehicle body 4. The front wheel 5F is supported by the vehicle body frame 8. The rear wheel 5R is supported by an output shaft of the rear wheel differential device 14. The traveling device 5 is a tire type in the present example embodiment, and may be a crawler type.

The coupling device 6 couples the working device 3 to a rear portion of the tractor 2. In the present example embodiment, the coupling device 6 includes a three-point link mechanism. However, a configuration of the coupling device 6 is not particularly limited as long as the working device 3 can be coupled to a rear portion of the traveling vehicle 2. For example, in a case where the traveling vehicle 2 is a pickup truck, the coupling device 6 couples the working device 3 by a mechanism other than the three-point link mechanism.

Figure 3:
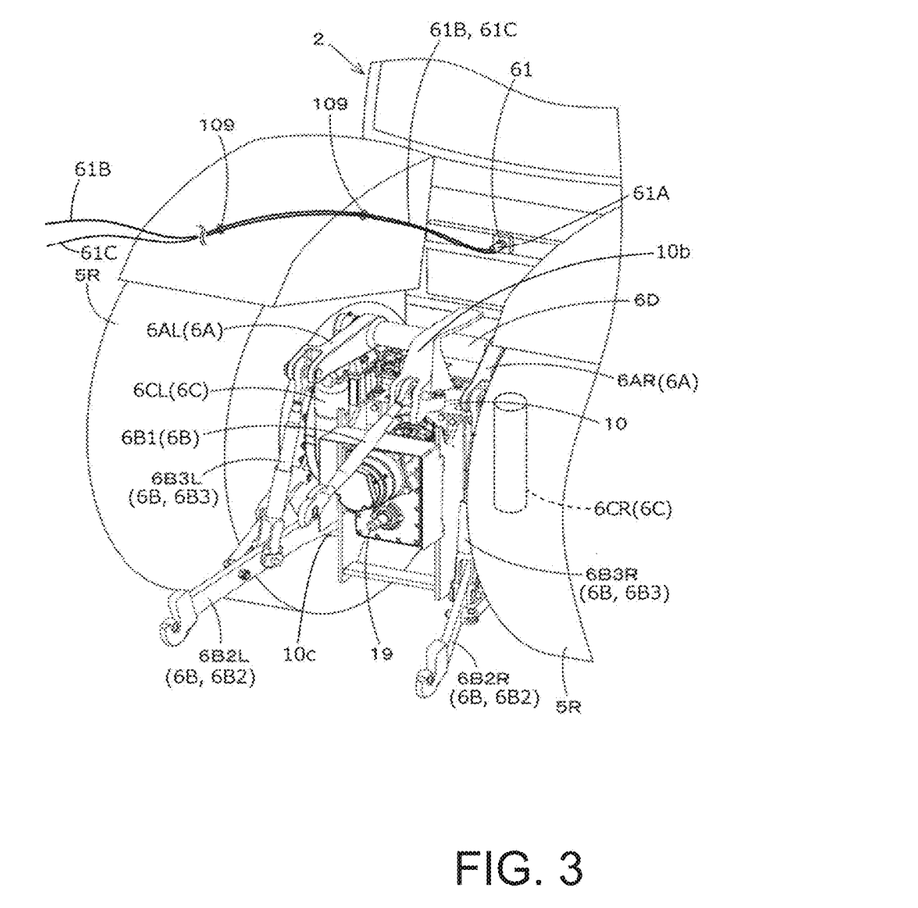
FIG. 3 is a perspective view of a rear side of a vehicle body including a coupling device of the working machine shown in FIG. 1.

As shown in FIG. 3, the coupling device 6 is coupled to a rear portion of the transmission case 10. The coupling device 6 includes a lift arm 6A, a three-point link mechanism 6B, and a lift cylinder 6C. The lift arm 6A includes a first lift arm 6AL and a second lift arm 6AR. The first lift arm 6AL is disposed on one side (left side) in the vehicle width direction. The second lift arm 6AR is disposed on the other side (right side) in the vehicle width direction. Front end portions of the first lift arm 6AL and the second lift arm 6AR are pivotally supported by a horizontal shaft 6D supported on an upper portion of the transmission case 10, and extend rearward.

The three-point link mechanism 6B includes a top link 6B1, a lower link 6B2, and a lift rod 6B3. The top link 6B1 is disposed between the first lift arm 6AL and the second lift arm 6AR, and has a front end portion pivotally supported by a first pivot support portion 10b provided on an upper portion of the transmission case 10. The lower link 6B2 includes a first lower link 6B2L and a second lower link 6B2R. Front end portions of the first lower link 6B2L and the second lower link 6B2R are pivotally supported by second pivot support portions 10c provided on a lower left portion and a lower right portion of the transmission case 10. The lift rod 6B3 includes a first lift rod 6B3L and a second lift rod 6B3R. An upper end portion of the first lift rod 6B3L is connected to a rear end portion of the first lift arm 6AL, and a lower end portion of the first lift rod 6B3L is connected to a middle portion of the first lower link 6B2L in a length direction. An upper end portion of the second lift rod 6B3R is connected to a rear end portion of the second lift arm 6AR, and a lower end portion of the second lift rod 6B3R is connected to a middle portion of the second lower link 6B2R in the length direction.

A joint that can couple the working device 3 is provided at a rear end portion of the top link 6B1 and a rear end portion of the lower link 6B2. By coupling the working device 3 to the rear end portion of the top link 6B1 and the rear end portion of the lower link 6B2, the working device 3 is coupled to the rear portion of the tractor 2 so as to be able to be lifted and lowered. The lift cylinder 6C is a hydraulic cylinder. The lift cylinder 6C includes a first lift cylinder 6CL and a second lift cylinder 6CR. One end portion of the first lift cylinder 6CL is connected to the first lift arm 6AL, and the other end portion of the first lift cylinder 6CL is connected to a lower left portion of the transmission case 10. One end portion of the second lift cylinder 6CR is connected to the second lift arm 6AR, and the other end portion of the second lift cylinder 6CR is connected to the lower right portion of the transmission case 10. By driving the lift cylinder 6C, the first lift arm 6AL and the second lift arm 6AR rotate about the horizontal shaft 6D and swing in a vertical direction. An electromagnetic control valve is connected to the first lift cylinder 6CL and the second lift cylinder 6CR. The electromagnetic control valve can drive (expand and contract) the first lift cylinder 6CL and the second lift cylinder 6CR based on a control signal from a controller 20.

By driving the lift cylinder 6C, a height of the working device 3 and an inclination of the working device 3 in the vehicle width direction (a difference between a height of a right portion and a height of a left portion) can be adjusted. At the time of adjusting the height, both the first lift cylinder 6CL and the second lift cylinder 6CR are similarly driven. At the time of adjusting the inclination, one of the first lift cylinder 6CL and the second lift cylinder 6CR is driven. Specifically, the lift cylinder disposed on a side where the height of the working device 3 is small is expanded, or the lift cylinder disposed on a side where the height is large is driven to be contracted.

The working device 3 is, for example, a spreading device for spreading a spread object (particulate matter or the like) such as a fertilizer or a chemical, a tilling device for tilling, a harvesting device for harvesting, a mowing device for mowing grass or the like, a distributing device for distributing grass or the like, a grass gathering device for gathering grass or the like, and a shaping device for shaping grass or the like. FIGS. 1, 2A and 2B show an example in which the spreading device is attached as the working device 3. The working device 3 is described in detail below.

Figure 4:
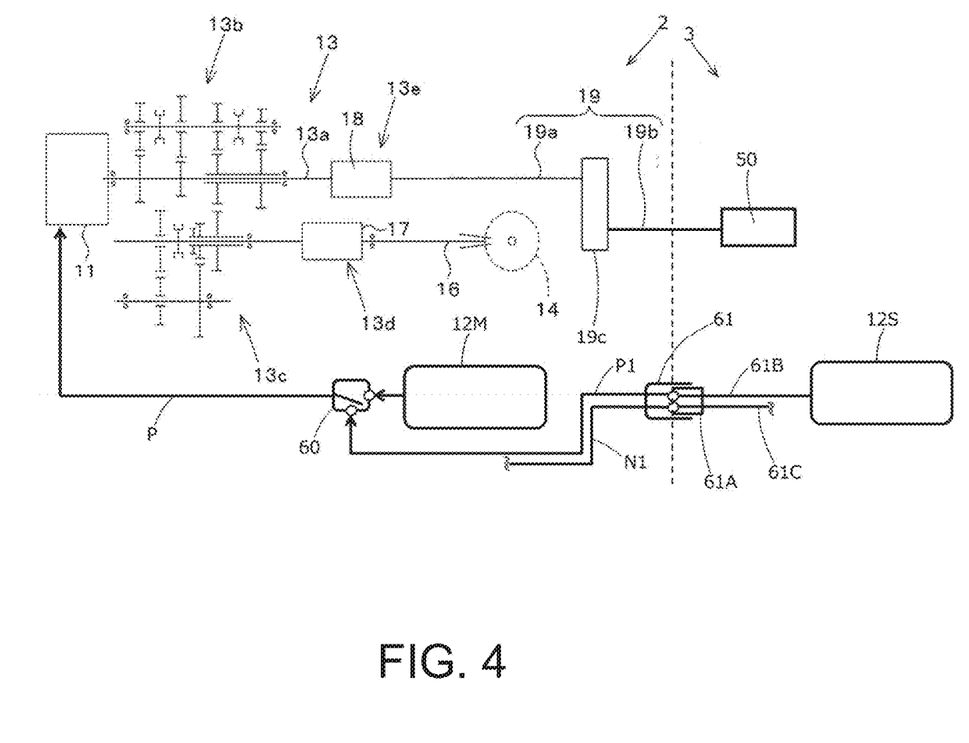
FIG. 4 is a diagram showing a power transmission system and an electric power supply system of the working machine shown in FIG. 1.

As shown in FIG. 4, the tractor 2 includes a PTO shaft 19. The PTO shaft 19 transmits power from the electric motor 11 that drives the tractor 2 to the working device 3 and the like. The electric motor 11 is electrically connected to the main battery 12M and the sub battery 12S via an inverter. More specifically, the main battery 12M and the electric motor 11 are connected by the main power supply path P. The main power supply path P is, for example, a harness or the like. In actual implementation, an inverter is interposed on a side of the main power supply path P that is adjacent to the electric motor 11. A switching device 60 is interposed in the main power supply path P closer to the main battery 12M than the inverter. A sub power supply path P1 extends toward a connector 61 so as to branch from the switching device 60. The sub power supply path P1 is, for example, a harness or the like.

The connector 61 is provided in the tractor 2 (vehicle body 4) as shown in FIG. 4. The connector 61 enables connection to the sub power supply path P1 from the outside. The connector 61 is connected to one end portion of the sub power supply path P1 on a side opposite to the switching device 60. The connector 61 is also connected to an in-vehicle network N1 in parallel with the sub power supply path P1 (see FIG. 5). The connector 61 is detachably connected to a cable connector 61A. Each of a power supply cable (supply path) 61B connected to the sub battery 12S and a communication cable (communication path) 61C connected to the working device 3 is connected to the cable connector 61A.

As shown in FIG. 3, the connector 61 is provided at the rear portion of the tractor 2, and is located above a front end portion of the top link 6B1 of the coupling device 6 and a front end portion of the lift arm 6A. The connector 61 is provided between the first lift arm 6AL and the second lift arm 6AR in the vehicle width direction. When the working device 3 is coupled to the tractor 2, the connector 61 disposed as described above faces the working device 3. In the present example embodiment, the connector 61 is provided in the tractor 2, but instead, the connector 61 may be provided in the working device 3, intermediate portions of the power supply cable 61B and the communication cable 61C, or the like.

In a state in which the cable connector 61A is connected to the connector 61, the switching device 60 operates in two modes based on a control signal from the controller 20. In one mode, the switching device 60 maintains electrical connection between the main battery 12M and the electric motor 11, and cuts off electrical connection between the sub battery 12S and the electric motor 11. In a case where a switching instruction is issued to the switching device 60 in the one mode, the switching device 60 provides the electrical connection between the sub battery 12S and the electric motor 11, and cuts off the electrical connection between the main battery 12M and the electric motor 11 in the other mode. The switching device 60 operating in this manner is, for example, a solid state relay or the like.

As shown in FIG. 4, electric energy to drive is supplied to the electric motor 11 from the main battery 12M or the sub battery 12S via the inverter. More specifically, in the one mode of the switching device 60, the electric energy is supplied from the main battery 12M to the electric motor 11 via the main power supply path P. In the other mode of the switching device 60, the electric energy is supplied from the sub battery 12S to the electric motor 11 via the power supply cable 61B, the connector 61, the sub power supply path P1, and the main power supply path P. The electric energy supplied to the electric motor 11 is adjusted by controlling the inverter according to a control signal from the controller 20, and ON/OFF of the electric motor 11 and a rotation speed of the output shaft are controlled. The sub battery 12S is described in detail below.

The PTO shaft 19 protrudes rearward from the transmission case 10. The transmission device 13 includes the main shaft (propulsion shaft) 13a, a main transmission 13b, an auxiliary transmission 13c, a shuttle 13d, and a PTO power transmission 13e. The propulsion shaft 13a is rotatably supported by a housing case of the transmission device 13. Power from the output shaft of the electric motor 11 is transmitted to the propulsion shaft 13a. The main transmission 13b includes a plurality of gears and a shifter that changes connection of the gears. The main transmission 13b changes and outputs (shifts) a rotational speed input from the propulsion shaft 13a by appropriately changing connection (meshing) of the plurality of gears with the shifter.

Similarly to the main transmission 13b, the auxiliary transmission 13c includes a plurality of gears and a shifter that changes connection of the gears. The auxiliary transmission 13c changes and outputs (shifts) a rotational speed input from the main transmission 13b by appropriately changing the connection (meshing) of the plurality of gears with the shifter. The shuttle 13d includes a shuttle shaft 16 and a forward/backward switch 17. The power output from the auxiliary transmission 13c is transmitted to the shuttle shaft 16 via a gear or the like. The rear wheel differential device 14 is provided on the shuttle shaft 16. A rear axle supporting the rear wheels 5R is rotatably supported by the rear wheel differential device 14. The forward/backward switch 17 may include, for example, a clutch such as a hydraulic clutch or an electric clutch, and switches a rotation direction of the shuttle shaft 16, that is, forward movement and backward movement of the tractor 2, by turning on and off the clutch.

The PTO power transmission 13e includes a PTO clutch 18 and the PTO shaft 19. The PTO shaft 19 is rotatably supported, and can transmit the power from the propulsion shaft 13a. The PTO shaft 19 includes a PTO propulsion shaft 19a and a PTO output shaft 19b. The PTO propulsion shaft 19a is connected to the PTO output shaft 19b via a PTO transmission 19c. However, the PTO propulsion shaft 19a may be connected to the PTO output shaft 19b without passing through the PTO transmission 19c. An output of the PTO output shaft 19b is transmitted to a power transmission mechanism 50 of the working device 3 described below.

The PTO transmission 19c can change a rotational speed of the PTO propulsion shaft 19a and transmit the rotation to the PTO output shaft 19b by an operator or actuator such as a PTO shift lever. The PTO transmission 19c includes, for example, a transmission actuator such as an electromagnetic solenoid or an electric motor capable of operating the operator or actuator based on a control signal from the controller 20. The PTO clutch 18 is capable of switching between a connected state in which the power of the propulsion shaft 13a is transmitted to the PTO shaft 19 and a disconnected state in which the power of the propulsion shaft 13a is not transmitted to the PTO shaft 19. Specifically, the PTO clutch 18 is provided between the propulsion shaft 13a and the PTO propulsion shaft 19a. The PTO clutch 18 may be a hydraulic clutch, an electric clutch, or the like, and can switch between a state in which the power of the propulsion shaft 13a (the power of the electric motor 11) is transmitted to the PTO shaft 19 and a state in which the power of the propulsion shaft 13a is not transmitted to the PTO shaft 19 by being turned on and off.

Figure 5:
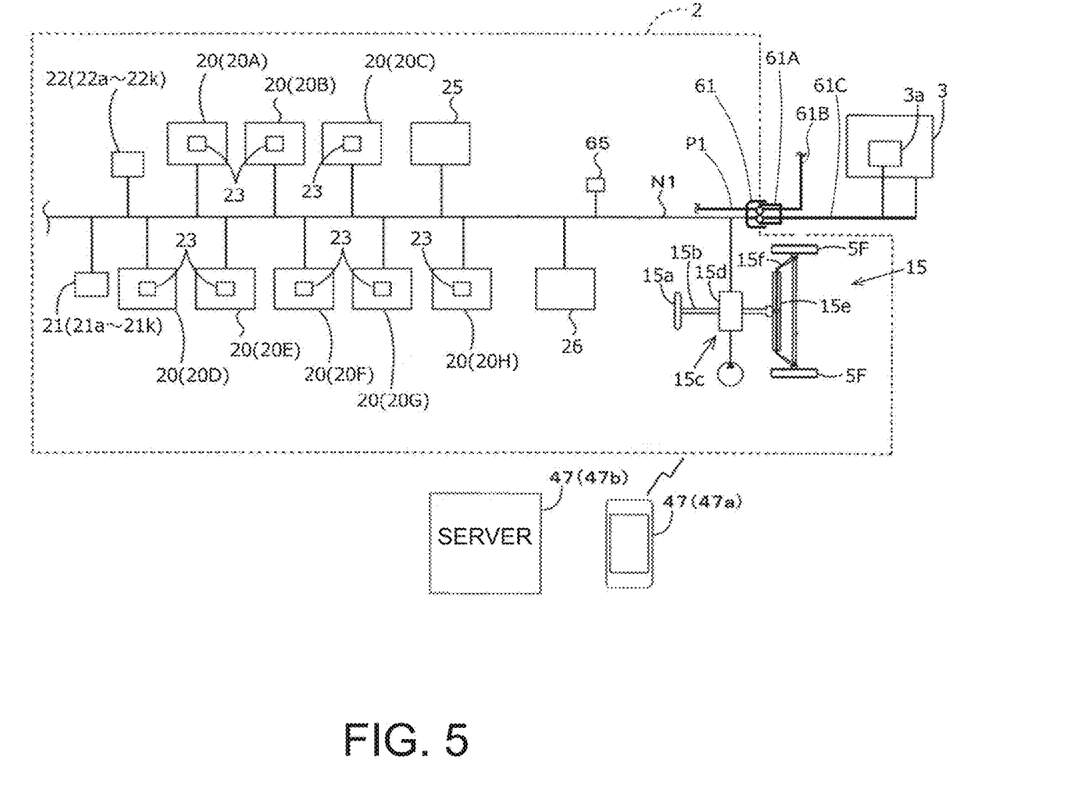
FIG. 5 is a diagram showing a control system and an information communication system of the working machine shown in FIG. 1.

As shown in FIG. 5, the tractor 2 includes a steering device 15. The steering device 15 includes a steering wheel 15a, a rotation shaft (steering shaft) 15b that rotates with the rotation of the steering wheel 15a, and an assist mechanism (power steering mechanism) 15c that assists the steering of the steering wheel 15a. The assist mechanism 15c includes a control valve 15d and a steering cylinder 15e. The control valve 15d is, for example, a three-position switching valve that can be switched by movement of a spool or the like. The control valve 15d can also be switched by steering of the steering shaft 15b. The steering cylinder 15e is connected to an arm (knuckle arm) 15f that changes an orientation of the front wheel 5F. Therefore, when the steering wheel 15a is operated, a switching position and an opening degree of the control valve 15d are switched according to the steering wheel 15a, and a steering direction of the front wheel 5F can be changed by expanding and contracting the steering cylinder 15e to the left or right according to the switching position and the opening degree of the control valve 15d. Note that the steering device 15 described above is an example, and is not limited to the above-described configuration.

As shown in FIG. 5, the tractor 2 includes a plurality of detectors 21. The plurality of detectors 21 are devices that detect a state of the tractor 2, and include, for example, a water temperature sensor 21a that detects a water temperature, a main battery sensor 21b that detects a voltage of the main battery 12M, a motor rotation sensor 21c that detects a rotation speed of the electric motor 11, an accelerator pedal sensor 21d that detects an operation amount of an accelerator pedal, a steering angle sensor 21e that detects a steering angle of the steering device 15, an angle sensor 21f that detects angles of the lift arms 6A and 7A, an inclination detection sensor 21g that detects an inclination of the vehicle body 4 in the width direction (rightward or leftward), a speed sensor 21h that detects a vehicle speed (speed) of the vehicle body 4, a PTO rotation sensor 21i that detects a rotation speed of the PTO shaft 19, a sub battery sensor 21j that detects a voltage of the sub battery 12S, a positioning sensor (positioning device) 21k that detects a position of the vehicle body 4 based on a signal of a positioning satellite or the like, or the like.

The positioning device 21k can detect its own position (positioning information including latitude and longitude) by a satellite positioning system (positioning satellite) such as D-GPS, GPS, GLONASS, BeiDou, Galileo, or Michibiki. That is, the positioning device 21k receives a satellite signal (a position of the positioning satellite, a transmission time, correction information, or the like) transmitted from the positioning satellite, and detects a position (for example, latitude and longitude) of the tractor 2, that is, the position of the vehicle body 4, based on the satellite signal. The positioning device 21k includes a reception device and an inertial measurement unit (IMU). The reception device is a device that includes an antenna or the like and receives the satellite signal transmitted from the positioning satellite, and is attached to the vehicle body 4 separately from the inertial measurement unit. In the present example embodiment, the reception device is attached to the vehicle body 4. Note that an attachment location of the reception device is not limited to that in the example embodiment.

The inertial measurement unit includes an acceleration sensor that detects an acceleration, a gyro sensor that detects an angular velocity, and the like, and is provided on a lower side of the vehicle body 4, for example, the driver seat 4a. The inertial measurement unit can detect a roll angle, a pitch angle, a yaw angle, and the like of the vehicle body 4. The speed sensor 21h detects the vehicle speed by converting, for example, a rotation speed of an axle of the front wheels 5F, the rotation speed of the axle of the front wheels 5F, a rotation speed of the front wheels 5F, a rotation speed of the rear wheels 5R, and the like into the vehicle speed. The speed sensor 21h can also detect a rotation direction of any one of the axle of the front wheels 5F, the axle of the rear wheels 5R, the front wheels 5F, and the rear wheels 5R, and can also detect whether or not the tractor 2 (vehicle body 4) is moving forward or backward. The above-described detector 21 is an example, and is not limited to the above-described sensor.

The tractor 2 also includes a plurality of operators 22. The plurality of operators 22 include a shuttle lever 22a that switches forward movement or backward movement of the vehicle body 4, an ignition switch 22b that starts the prime mover 11 and the like, a PTO shift lever 22c that sets the rotation speed of the PTO shaft 19, a shift changeover switch 22d that switches between automatic shift and manual shift, a shift lever 22e that manually switches a shift stage (shift level) of the transmission device 13, an accelerator 22f that increases or decreases the vehicle speed, a pump switch 22g that operates lifting and lowering of the coupling device 6, a height setting dial 22h that sets an upper limit of an operation of the coupling device 6, a vehicle speed lever 22i that sets the vehicle speed, a hydraulic operation tool 22j, a rotation setting tool 22k that sets an upper limit of a rotation speed of the prime mover rotation, and the like.

Setting tools such as the shift changeover switch 22d, the height setting dial 22h, and the rotation setting tool 22k are provided in a console box provided on a side of the driver seat 4a. An operation of the vehicle body 4 can be set by the driver operating the setting tool (the shift changeover switch 22d, the height setting dial 22h, or the rotation setting tool 22k). Note that the above-described operator 22 is an example, and is not limited to the above-described configuration.

As shown in FIG. 5, the tractor 2 includes a plurality of controllers 20. The controller 20 is configured or programmed to perform various controls of the tractor 2, and may include a central processing unit (CPU), an electric/electronic circuit, or the like. The controller 20 includes a storage 23 to store various information such as a control program, identification information, and the like. The storage 23 may include a nonvolatile memory or the like. That is, the plurality of controllers 20 are electrical components including the storage 23.

The plurality of controllers 20 is configured or programmed to include a shift controller 20A, a motor controller 20B, a PTO controller 20C, a lifting/lowering controller 20D, an automatic steering controller 20E, a pose controller 20F, a battery switching controller 20G, and an automated traveling controller 20H. Note that the controller 20 does not need to include all of the shift controller 20A, the motor controller 20B, the PTO controller 20C, the lifting/lowering controller 20D, the automatic steering controller 20E, the pose controller 20F, the battery switching controller 20G, and the automated traveling controller 20H, and may be provided according to a specification of the tractor.

In addition, the shift controller 20A, the motor controller 20B, the PTO controller 20C, the lifting/lowering controller 20D, the automatic steering controller 20E, the pose controller 20F, the battery charge/discharge controller 20G, an the automated traveling controller 20H may be provided in an integrated controller. The shift controller 20A performs shift control. In the shift control, in a case where an automatic shift function is enabled, any one of the main transmission 13b or the auxiliary transmission 13c is automatically switched according to the state of the tractor 2, and the shift stage (shift level) of the transmission device 13 is automatically changed to a predetermined shift stage (shift level). In the shift control, in a case where the shift changeover switch 22d is switched to the manual shift, any one of the main transmission 13b or the auxiliary transmission 13c is automatically switched according to the shift stage (shift level) set by the shift lever 22e to change the shift stage of the transmission device 13.

The shift controller 20A performs control (travel switching control) in a travel driving state (an operation of the traveling device 5) of the traveling device 5. In the travel switching control, in a case where shuttle lever 22a is operated to switch to forward movement, the forward/backward switch 17 of shuttle 13d is switched to forward movement to move the vehicle body 4 forward. In the travel switching control, in a case where the shuttle lever 22a is operated to switch to backward movement, the forward/backward switch 17 of shuttle 13d is switched to backward movement to move the vehicle body 4 backward.

The motor controller 20B controls the electric motor 11 by inverter control. In the electric motor control, in a case where the ignition switch 22b is operated to be turned on, the electric motor 11 is started through predetermined processing, and in a case where the ignition switch 22b is operated to be turned off, the driving of the electric motor 11 is stopped. In the electric motor control, in a case where the accelerator 22f is operated, the vehicle speed (speed) of the vehicle body 4 is changed by controlling the inverter to change the rotation speed of the electric motor 11 according to an operation amount of the accelerator 22f.

The PTO controller 20C performs PTO control. In the PTO control, in a case where the PTO shift lever 22c is operated, the rotational speed (PTO rotational speed) of the PTO propulsion shaft 19a is changed by switching a PTO shift gear of the PTO transmission 19c.

The lifting/lowering controller 20D performs lifting/lowering control in the coupling device 6. In the lifting/lowering control, in a case where a manual lifting/lowering function is enabled and the pump switch 22g is operated in a lifting direction (lifting side), a control valve is controlled to expand the lift cylinder 6C and lift a rear end portion (an end portion adjacent to the working device 3) of the lift arm 6A. In the lifting/lowering control, in a case where the manual lifting/lowering function is enabled and the pump switch 22g is operated in a lowering direction (lowering side), the control valve is controlled to contract the lift cylinder 6C and lower the rear end portion (the end portion adjacent to the working device 3) of the lift arm 6A. In a case where the working device 3 is lifted by the coupling device 6, when a position of the working device 3, that is, an angle of the lift arm 6A, reaches an upper limit (height upper limit value) set by the height setting dial 22h, the lifting operation in the first coupling device 6 is stopped.

In the lifting/lowering control, in a case where a backup function is enabled, the control valve is automatically controlled when the vehicle body 4 moves backward to expand the lift cylinder 6C and lift the rear end portion (the end portion adjacent to the working device 3) of the lift arm 6A. In the lifting/lowering control, in a case where an auto-up function is enabled and the steering angle of the steering device 15 becomes equal to or greater than a predetermined value, the control valve is automatically controlled to expand the lift cylinder 6C and lift the rear end portion (the end portion adjacent to the working device 3) of the lift arm 6A.

The automatic steering controller 20E performs automatic steering control. In the automatic steering control, in a case where a driving changeover switch 65 described below is operated to be turned on, the steering device 15 is automatically controlled to change the steering direction of the front wheel 5F such that the vehicle body 4 travels along a set scheduled travel route.

The pose controller 20F performs pose control. In the pose control, in a case of adjusting the height of the working device 3, lengths of both the first lift cylinder 6CL and the second lift cylinder 6CR are fixed to predetermined lengths by outputting a control signal to a control valve. In the pose control, in a case of adjusting the inclination in the vehicle width direction (the difference between the height of the right portion and the height of the left portion), any one of the first lift cylinder 6CL and the second lift cylinder 6CR is driven by outputting a control signal to the control valve.

The battery switching controller 20G performs battery switching control. In the battery switching control, the battery that supplies the electric energy to the electric motor 11 is switched to any one of the main battery 12M and the sub battery 12S. In the battery switching control, in a state in which the electric motor 11 and the main battery 12M are connected to each other and the sub battery 12S is cut off by the switching device 60, the switching device 60 is controlled to connect the electric motor 11 and the sub battery 12S and cut off the main battery 12M when a predetermined condition is satisfied. The predetermined condition may be satisfied, for example, when a remaining level of the main battery 12M is equal to or lower than a predetermined value and a remaining level of the sub battery 12S is equal to or higher than a predetermined value. In this case, the remaining level of the main battery 12M is calculated based on a voltage or the like of the main battery 12M detected by the main battery sensor 21b. The remaining level of the sub battery 12S is calculated based on a voltage or the like of the sub battery 12S detected by the sub battery sensor 21j.

The driving changeover switch 65 is connected to the tractor 2. The driving changeover switch 65 is a switch that can be switched to be turned on and off, and can set the automated traveling controller 20H to an automated driving mode when being turned on, and can set the automated traveling controller 20H to a manual driving mode when being turned off. The automated traveling controller 20H controls automated driving of the vehicle body 4. The automated traveling controller 20H starts the automated driving in the automated driving mode. In the control of the automated driving, the steering angle of the steering device 15 is changed based on a deviation between the position of the vehicle body 4 and the set scheduled travel route. The setting of the steering angle in the automated driving in the above-described example embodiment is an example and is not limited. In a case where the scheduled travel route and the vehicle speed are associated with each other, the automated traveling controller 20H automatically changes the shift stage of the transmission device 13, the rotation speed of the electric motor 11, and the like such that the current vehicle speed of the tractor 2 matches the vehicle speed corresponding to the scheduled travel route.

The tractor 2 includes a communication module 26. The communication module 26 is configured or programmed to perform any one of direct communication and indirect communication with an external device 47, and can perform radio communication by, for example, wireless fidelity (Wi-Fi) (registered trademark) of the IEEE 802.11 series which is a communication standard, Bluetooth (registered trademark) low energy (BLE), low power wide area (LPWA), low-power wide-area network (LPWAN), or the like. Furthermore, the communication module 26 may be a communication module that performs radio communication by a mobile phone communication network, a data communication network, or the like.

The external device 47 is, for example, a portable type terminal (portable terminal) 47a such as a tablet, a smartphone, or a personal digital assistant (PDA), or a fixed type terminal (fixed terminal) 47b such as a fixed type computer such as a personal computer or a server. The tractor 2 includes a display device 25. The display device 25 is a device that displays various information regarding the tractor 2. The display device 25 is installed in the vicinity of the driver seat 4a, so that the driver can confirm a displayed content. The display device 25 is a meter panel device that displays driving information, an auxiliary panel device that performs various settings related to the working machine, and the like.

The tractor 2 (vehicle body 4) includes the in-vehicle network N1. The in-vehicle network N1 is a network such as a controller area network (CAN), a local interconnect network (LIN), media oriented system transport (MOST), FlexRay, or ISO11783 (ISOBUS). The plurality of controllers 20, the plurality of detectors 21, the plurality of operators 22, the communication module 26, and the display device 25 are connected to the in-vehicle network N1.

As shown in FIGS. 3, 4, and 5, the connector 61 provided on the rear side of the tractor 2 (vehicle body 4) enables connection from the outside to the in-vehicle network N1. The communication cable 61C connects the tractor 2 and the spreading device 3. One end portion of the communication cable 61C is connected to the cable connector 61A, and the other end portion of the communication cable 61C is connected to the working device 3. The power supply cable 61B connects the tractor 2 and the spreading device 3. One end portion of the power supply cable 61B is connected to the cable connector 61A, and the other end portion of the power supply cable 61B is connected to the electric motor 50a of the spreading device 3. In this manner, the cable connector 61A aggregates one end portions of the power supply cable 61B and the communication cable 61C.

The connector 61 and the cable connector 61A are attachable to and detachable from each other. Shapes of the connector 61 and the cable connector 61A are not limited as long as the power supply cable 61B and the communication cable 61C are attachable and detachable. For example, the connector 61 may include a power supply male pin connected to a terminal end of the working device supply path P4 and a communication male pin connected to a terminal end of the in-vehicle network N1, and the cable connector 61A may include a power supply female pin connected to one end portion of the power supply cable 61B and a communication female pin connected to one end portion of the communication cable 61C. In the connector 61 and the cable connector 61A, the male pins and female pins may be provided in a reverse way.

When the connector 61 and the cable connector 61A are mounted on each other, the power supply male pin and the power supply female pin are connected to each other, and the communication male pin and the communication female pin are connected to each other. Accordingly, the electric energy can be supplied from the sub battery 12S to the tractor 2 (vehicle body 4) via the connector 61, and a communication signal can be transmitted between the tractor 2 and the working device 3. On the other hand, when the connector 61 and the cable connector 61A are separated from each other, the connection between the power supply male pin and the power supply female pin and the connection between the communication male pin and the communication female pin are released. As a result, the supply of the electric energy from the sub battery 12S to the tractor 2 (vehicle body 4) via the connector 61 is cut off, and the transmission of the communication signal between the tractor 2 and the working device 3 is cut off. In a state in which the cable connector 61A is separated from the connector 61, the connector 61 may be closed by a lid body.

Figure 6:
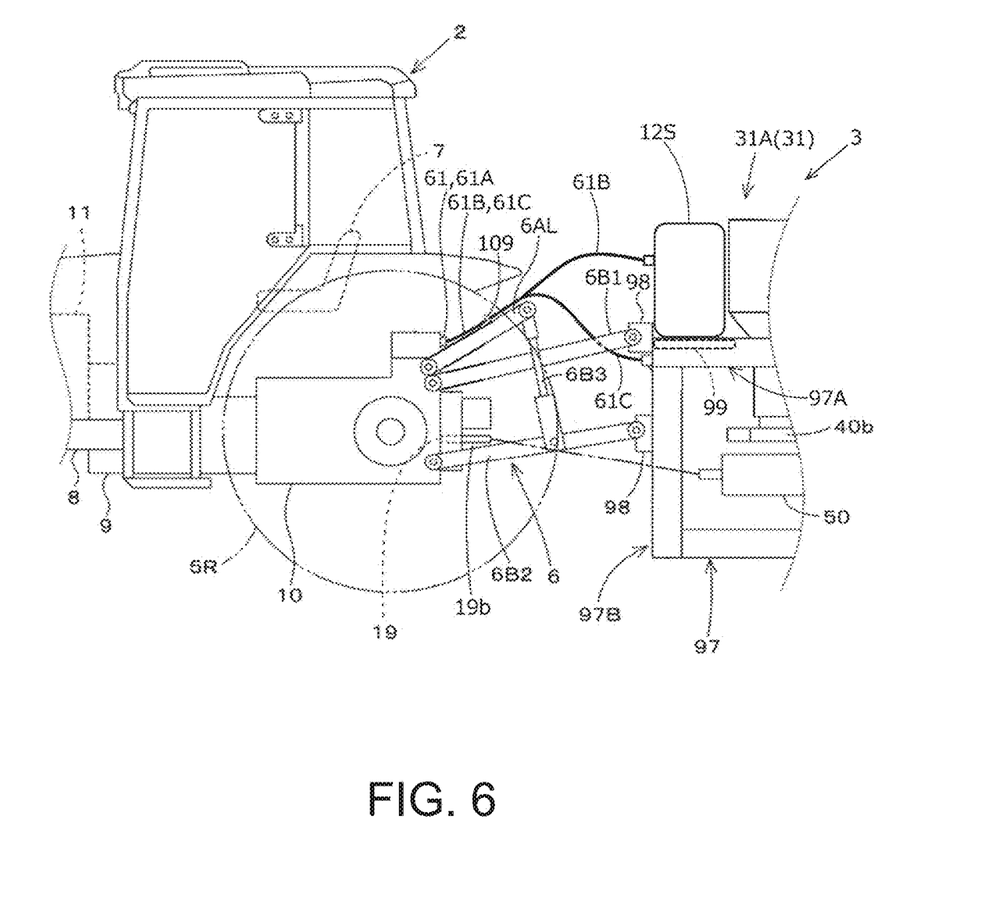
FIG. 6 is a side view for explaining a state in which the working device is coupled to a traveling vehicle of the working machine shown in FIG. 1.

As shown in FIGS. 3 and 6, the power supply cable 61B and the communication cable 61C may be bound by a binding tool 109 so as to be integrated with each other on a side adjacent to the cable connector 61A, and may be branched from each other while extending rearward from the cable connector 61A. The power supply cable 61B and the communication cable 61C may be integrally routed at a bound portion, and may be separately routed behind a branch portion. For example, the bound portion of the power supply cable 61B and the communication cable 61C is routed toward the working device 3 through above the coupling device 6 (above the top link 6B1). Behind the branch portion of the power supply cable 61B and the communication cable 61C, the routing is separately adjusted according to connection positions of the sub battery 12S and the working device 3.

The working device 3 is a device that performs the agricultural work. In other words, the working device 3 is a device to perform work on the farm field. The working device 3 is driven by transmission of the power from the PTO shaft 19 of the tractor 2. Specifically, as the working device 3, a spreading device that spreads a spread object in the farm field, a seeding device that sows seeds in the farm field, a shaping device (baler) that gathers and shapes harvested crops (grass or the like), and the like are suitably used. As the spreading device, a fertilizer spreading device (spreader) for spreading a fertilizer to the farm field, a chemical spreading device (sprayer) for spreading a chemical (chemical solution) to the farm field, or the like is used. As the seeding device, for example, a seeder such as a drill seeder for row planting, a planter for sowing seeds at regular intervals, or the like is used. In the present example embodiment, since the working device 3 is the spreading device, the working device 3 will be described below as the spreading device 3.

As shown in FIGS. 1, 2A and 2B, the spreading device 3 includes a housing 31 and a spreader 32. The housing 31 stores the spread object (a fertilizer, a pesticide, or the like) to be spread to the farm field. The housing 31 includes a hopper having a substantially inverted pyramid shape. The hopper includes a first hopper 31A and a second hopper 31B. The first hopper 31A is disposed on one side (left side) in the vehicle width direction. The second hopper 31B is disposed on the other side (right side) in the vehicle width direction. However, the number of hoppers is not limited. The housing 31 has an inlet for the spread object at an upper end and has an outlet for discharging the spread object at a lower end. The number of outlets is not limited, and is set according to the number of rotating bodies (disks) 40 described below in the present example embodiment. Specifically, the number of rotating bodies 40 is two, and the number of outlets is also two. Note that the number of rotating bodies 40 may be two, and the number of outlets may be one.

The spreader 32 is performs the agricultural work (spreading of the spread object such as a fertilizer or a chemical) by rotating. The spreader 32 spreads the spread object stored in the housing 31. As shown in FIG. 1, the spreader 32 is provided below the housing 31. The spreader 32 includes at least two or more spreaders. It is preferable that at least two or more spreaders have different spreading directions, but the at least two or more spreaders may include spreaders having the same spreading direction.

FIG. 2A is a plan view of a rear portion of the working machine 1, and FIG. 2B is a rear view of the spreading device 3. As shown in FIGS. 2A and 2B, the spreader 32 includes a first spreader 321 and a second spreader 322. That is, in the present example embodiment, the number of spreaders 32 is two. However, the number of spreaders 32 is not limited to two, and may be three or more. The number of spreaders 32 and the number of rotating bodies 40 are the same as each other. The first spreader 321 and the second spreader 322 are provided side by side in the vehicle width direction. Hereinafter, the two spreaders (the first spreader 321 and the second spreader 322) will be described.

The first spreader 321 is disposed on one side (left side) in the vehicle width direction. The second spreader 322 is disposed on the other side (right side) in the vehicle width direction. As shown in FIGS. 1, 2A and 2B, the first spreader 321 includes a first rotating body 410 and a first shutter device 411. The first rotating body 410 has a disk shape and rotates about a central axis 40a extending in a longitudinal direction (vertical direction). A plurality of rotating blades (blade members) 40b are attached to an upper surface of the first rotating body 410. The rotating blade 40b rotates about the central axis 40a together with the first rotating body 410. The plurality of rotating blades 40b are disposed at intervals in a circumferential direction, and extend radially outward from the vicinity of the central axis 40a. As the first rotating body 410 rotates about the central axis 40a, the rotating blades 40b hit and radially scatter the spread object falling from a first outlet 311 outward (radially outward).

The first shutter device 411 includes a shutter and an electric motor (not shown). The shutter is attached to the first outlet 311 on one side of the housing portion 31, and can change an area (opening degree) of the first outlet 311 by moving. The electric motor is a stepping motor or the like, and is coupled to the shutter. The first shutter device 411 changes the opening degree of the first outlet 311 by moving the shutter by driving the electric motor. As a result, a spread amount of the spread object by the first spreader 321 is adjusted.

The second spreader 322 includes a second rotating body 420 and a second shutter device 421. Since a configuration of the second rotating body 420 is similar to that of the first rotating body 410, the description thereof will be omitted. A configuration of the second shutter device 421 is the same as that of the first shutter device 411 except that the shutter is attached to the second outlet 312 on the other side of the housing portion 31. The second shutter device 421 can adjust a spread amount of the spread object by the second spreader 322 by changing an opening degree of the second outlet 312.

The first rotating body 410 and the second rotating body 420 are provided side by side in the vehicle width direction and rotate in directions different from each other. In the present example embodiment, the first rotating body 410 rotates in a clockwise direction and the second rotating body 420 rotates in a counterclockwise direction in plan view as indicated by black arrows in FIGS. 2A and 2B.

The first rotating body 410 is disposed below the first outlet 311 of the housing portion 31. The spread object falling from the first outlet 311 is spread by the rotating first rotating body 410. The second rotating body 420 is disposed below the second outlet 312 of the housing portion 31. The spread object falling from the second outlet 312 is spread by the rotating second rotating body 420. In the present example embodiment, the spreading directions of the first spreader 321 and the second spreader 322 are different from each other. The spreading direction of the first spreader 321 is one side in the vehicle width direction and the rear side. The spreading direction of the second spreader 322 is the other side in the vehicle width direction and the rear side. In the present example embodiment, the main spreading direction of the first spreader 321 is the left side and a rear left side, and the main spreading direction of the second spreader 322 is the right side and a rear right side as indicated by outlined arrows in FIGS. 2A and 2B. Note that the direction indicated by the outlined arrow is the main spreading direction, and in actual implementation, spreading is performed in a fan shape including the direction indicated by the outlined arrow.

The spreading device 3 includes a power transmission mechanism 50. The power transmission mechanism 50 includes an input/output shaft, a gear, and the like, receives the power supplied from the electric motor 11, and transmits the input power to the spreader 32. Specifically, the power transmission mechanism 50 is capable of transmitting the power from the PTO shaft 19 to the first rotating body 410 and the second rotating body 420. That is, the first rotating body 410 and the second rotating body 420 can be rotated by the power from the electric motor 11. In addition, rotational speeds of the first rotating body 410 and the second rotating body 420 can be changed by a transmission of the power transmission mechanism 50. The housing 31, the spreader 32, and the power transmission mechanism 50 configured as described above are supported by a frame 97.

As shown in FIG. 6, the spreading device 3 includes the frame 97. However, a configuration of the frame 97 is not limited to the shown configuration. In the following description, directions related to the frame 97 (up, down, front, rear, left, and right) are based on a state in which the spreading device 3 is coupled to the rear portion of the tractor 2. The frame 97 includes an upper frame 97A, a lower frame 97B, a coupling portion 98, and a battery loading portion 99. The frame 97 including the battery loading portion 99 is made of a metal material such as a steel material having high thermal conductivity as a whole.

As shown in FIGS. 2 and 6, the upper frame 97A is a frame that supports the housing portion 31, and is located above the spreader 32. The upper frame 97A preferably has a rectangular or substantially rectangular frame shape in plan view. The housing portion 31 (the first hopper 31A and the second hopper 31B) is provided behind the upper frame 97A in plan view. The battery loading portion 99 is installed at an upper end portion of the upper frame 97A and in front of the housing portion 31. The battery loading portion 99 preferably a rectangular or substantially rectangular plate shape, and a long side and a short side extend in the vehicle width direction and the front-rear direction, respectively. An upper surface of the battery loading portion 99 is configured to be capable of loading the sub battery 12S.

As described above, the sub battery 12S is not loaded on the tractor 2, but is loaded by effectively using a space of the spreading device 3. Therefore, it is not necessary to newly provide a configuration to load the sub battery 12S on the tractor 2, and the sub battery 12S can be easily loaded. In addition, it is possible to reduce or prevent an increase in size of the entire working machine. In addition, a loading position of the sub battery 12S can be brought close to the center of gravity, and a weight balance of the entire working machine can be prevented from being lost. In addition, since the loading position of the sub battery 12S is on a front side of the housing portion 31, input of a material to the spreading device 3 is not interfered. In addition, even when heat generation from the sub battery 12S increases due to a large degree of discharge of the sub battery 12S or the like, the frame 97 can be used as a heat sink via the battery loading portion 99 made of a metal material.

As shown in FIG. 6, the lower frame 97B is disposed below the upper frame 97A. The spreader 32 (the first spreader 321 and the second spreader 322) and the power transmission mechanism 50 are supported by the lower frame 97B via a bracket so as to be located in a hollow portion having the rectangular or substantially rectangular frame shape. The coupling portion 98 is provided at a position corresponding to a rear end portion of the three-point link mechanism 6B (the top link 6B1, the first lower link 6B2L, and the second lower link 6B2R) of the coupling portion 6 at a front end portion of the frame 97. The coupling portion 98 is detachably coupled to the coupling device 6 provided at the rear portion of the tractor 2. By coupling the coupling portion 98 to the coupling device 6, the spreading device 3 is detachably coupled to the rear portion of the tractor 2.

As shown in FIG. 5, the spreading device 3 includes a work controller 3a. The work controller 3a is a device that performs various controls of the spreading device 3, and is a CPU, an electric/electronic circuit, or the like. The work controller 3a includes a storage that stores various information such as a control program, identification information, and the like. The storage may include a nonvolatile memory or the like. The work controller 3a is connected to the in-vehicle network N1 via the communication cable 61C and the connector 61 connecting the spreading device 3 and the tractor 2. As a result, a communication signal can be transmitted and received between the tractor 2 and the spreading device 3.

In general, when stored electric energy of the battery is used up, charging is required. Because charging requires stoppage of traveling and work, there is a demand for appropriately loading as many batteries as possible on the working machine 1. In the present example embodiment, the sub battery 12S is loaded in addition to the main battery 12M.

A configuration of the sub battery 12S is different from a configuration of the main battery 12M in that the sub battery 12S is connected to the power supply cable 61B and the stored electric energy is sent to the power supply cable 61B. Except for this point, the configuration of the sub battery 12S is equivalent to the configuration of the main battery 12M. In the present example embodiment, the sub battery 12S is loaded in addition to the main battery 12M. However, a package capable of storing the energy source may be mounted instead of the sub battery 12S. As the package, for example, a hydrogen tank, a liquified petroleum gas (LPG) tank, or the like may be used. In a case where the hydrogen tank is loaded on the working device 3, for example, a fuel cell that generates electric power with hydrogen and oxygen in the air may be mounted on the tractor 2, and hydrogen from the tank may be supplied to the fuel cell. In a case where the LPG tank is loaded on the working device 3, for example, a generator that generates electric power by a gas engine may be mounted on the tractor 2, and gas from the tank may be supplied to the gas engine. In these cases, the power supply cable 61B may be replaced with a fuel pipe.

As shown in FIGS. 1 and 6, the sub battery 12S is loaded on the spreading device 3. More specifically, the sub battery 12S is detachably loaded on the upper surface of the battery loading portion 99 of the frame 97 via an attachment. In a case where the loaded sub battery 12S is used up, the sub battery 12S is detached from the battery loading portion 99, and a new fully charged sub battery 12S is loaded on the battery loading portion 99. That is, the sub battery 12S is a replaceable battery.

In the working machine 1 configured as described above, in a state in which the sub battery 12S is loaded on the spreading device 3 and the spreading device 3 is coupled to the tractor 2, traveling and the work are started by turning on an ignition. At this time, the remaining level of the main battery 12M is higher than a predetermined value. Therefore, it is assumed that the remaining level of the main battery 12M is sufficient, and the main battery 12M is connected to the electric motor 11. As a result, the electric energy from the main battery 12M is supplied to the electric motor 11, and the electric motor 11 is driven under inverter control. A driving force of the electric motor 11 is transmitted and converted to traveling of the tractor 2 and operation of the spreading device 3. As the traveling and work of the working machine 1 continue, the remaining level of the main battery 12M decreases. In this state, the sub battery 12S is not used.

When the decreasing remaining level of the main battery 12M becomes equal to or lower than a predetermined value, the battery switching controller 20G instructs the switching device 60 to perform the battery switching control. By the battery switching control, the sub battery 12S is connected to the electric motor 11 instead of the main battery 12M. As a result, the electric energy from the sub battery 12S is supplied to the electric motor 11, and the driving of the electric motor 11 can be continued. Therefore, the traveling and work can be continued according to a capacity of the sub battery 12S without being stopped in order to charge the main battery 12M having a decreased remaining charge level.

Second Example Embodiment

Figure 7:
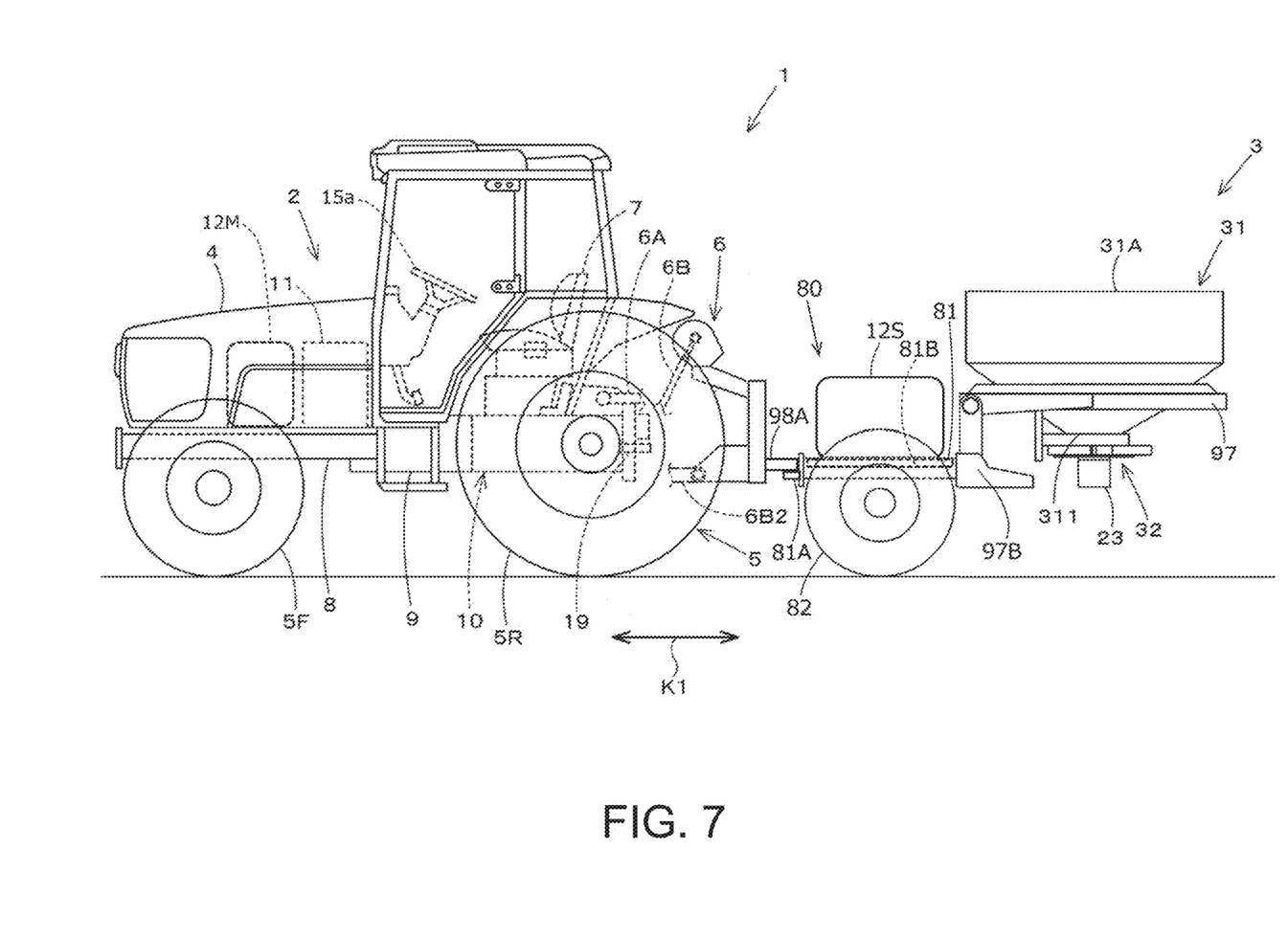
FIG. 7 is an overall view of a working machine according to a second example embodiment of the present invention.
Figure 8:
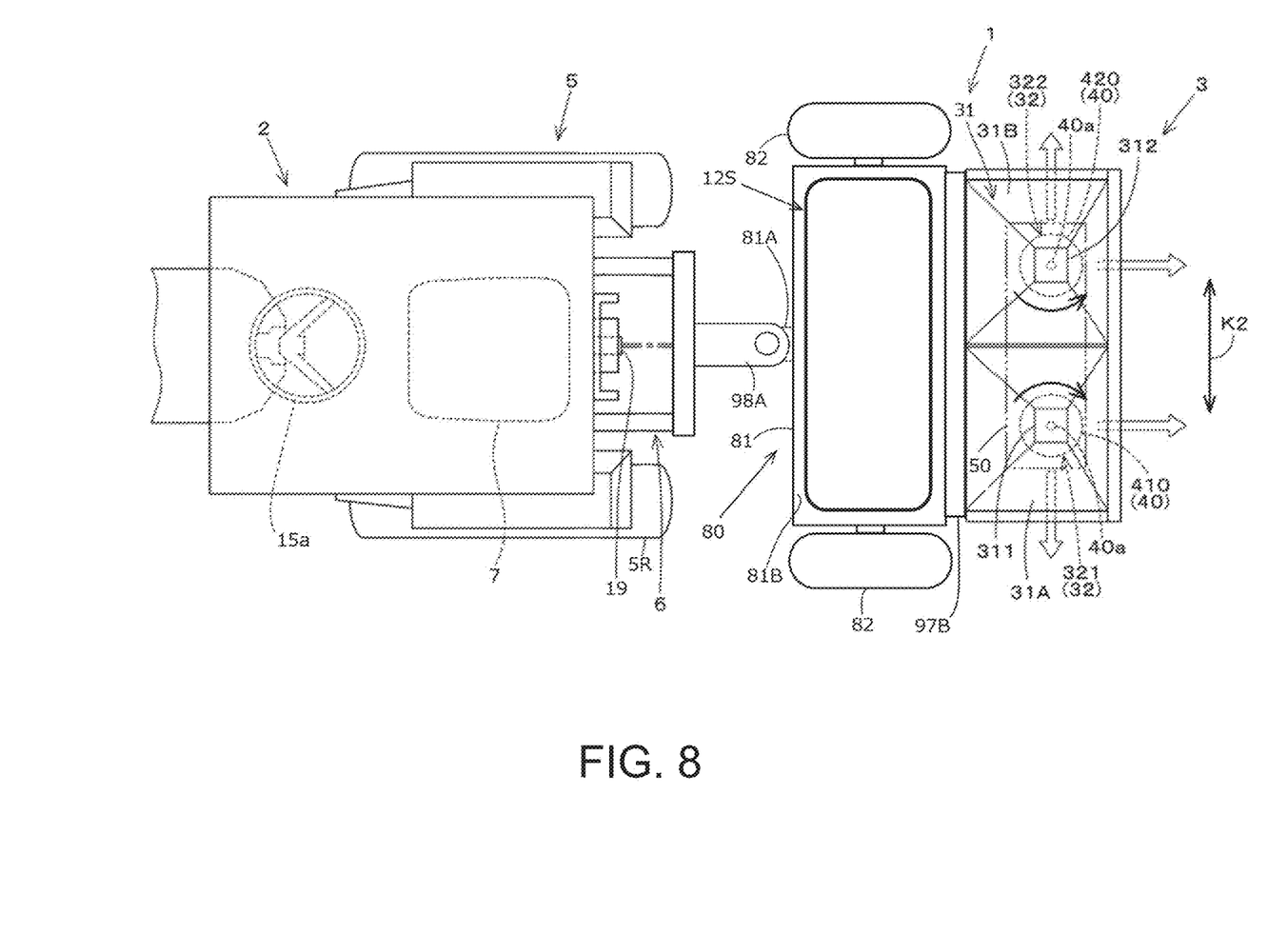
FIG. 8 is a plan view of a rear portion of the working machine shown in FIG. 7.

FIG. 7 is an overall side view of a working machine 1 according to a second example embodiment. FIG. 8 is a plan view of a rear portion of the working machine 1. As shown in FIGS. 7 and 8, a configuration of the working machine 1 according to the second example embodiment is different from that of the first example embodiment described above in that a towed trailer 80 on which a sub battery 12S is loaded is coupled to a tractor 2, and a spreading device 3 is coupled to the towed trailer 80. The other points are the same as the configuration of the first example embodiment. Hereinafter, differences of the second example embodiment from the first example embodiment will be described. In the second example embodiment, the same or equivalent portions as those in the first example embodiment are denoted by the same reference numerals, and the description thereof will be omitted.

The working machine 1 according to the second example embodiment includes the towed trailer 80 coupled to the spreading device (working device) 3. The sub battery 12S is coupled to the tractor 2 by being loaded on the towed trailer 80.

The battery loading portion 99 according to the first example embodiment is not provided in a frame 97 of the spreading device 3, and a volume occupied by a housing portion 31 with respect to the entire frame 97 is larger than that of the first example embodiment. That is, in the second example embodiment, the sub battery 12S is not loaded on the spreading device 3, and a volume corresponding to the sub battery 12S is allocated to the housing portion 31. Therefore, more materials such as fertilizers and pesticides can be housed. A drawbar 98A is provided in the coupling device 6 of the tractor 2. The drawbar 98A is disposed at a rear end portion of the coupling device 6 so as to expand rearward from a substantially central portion in the vehicle width direction. The drawbar 98A detachably connects the towed trailer 80 at a rear end portion.

As shown in FIGS. 7 and 8, the towed trailer 80 includes a frame 81 and wheels 82. However, a configuration of the towed trailer 80 is not limited to the shown configuration. The frame 81 includes a coupling portion 81A and a battery loading portion 81B. The frame 81 including the battery loading portion 81B is made of a metal material such as a steel material having high thermal conductivity as a whole. The frame 81 is a frame to load the sub battery 12S, and is located above an axle of the wheels 82. The frame 81 preferably has a rectangular or substantially rectangular frame shape in plan view.

At a front end portion of the frame 81, the coupling portion 81A is provided at a position corresponding to the rear end portion of the drawbar 98A. The coupling portion 81A is detachably coupled to the drawbar 98A provided at the rear end portion of the coupling device 6 of the tractor 2. By coupling the coupling portion 81A to the drawbar 98A, the towed trailer 80 is detachably coupled to a rear portion of the tractor 2.

Two wheels 82 are provided at a lower portion of the frame 81. One wheel 82 is provided at each of left and right end portions of the axle extending in the vehicle width direction. The axle is rotatably supported by the frame 81, and when the towed trailer 80 is towed, the wheels 82 and the axle coaxially rotate, so that the towed trailer 80 can move in a towing direction.

The towed trailer 80 is coupled to the drawbar 98A at the rear portion of the tractor 2 via the coupling portion 81A of the frame 81. In the spreading device 3, a front end portion of a lower frame 97B is coupled to a rear end portion of the frame 81 of the towed trailer 80. As a result, when the tractor 2 moves, the towed trailer 80 is towed via the drawbar 98A, and the spreading device 3 is also towed by the towed trailer 80. In the second example embodiment, the tractor 2 corresponds to a first moving entity, and the working device 3 and the towed trailer 80 correspond to a second moving entity.

The battery loading portion 81B is installed at an upper end portion of the frame 81. The battery loading portion 81B preferably has a rectangular or substantially rectangular plate shape, and a long side and a short side extend in the vehicle width direction and the front-rear direction, respectively. An upper surface of the battery loading portion 81B is configured to be capable of loading the sub battery 12S.

More specifically, the sub battery 12S is detachably loaded on the upper surface of the battery loading portion 81B of the frame 81 via an attachment. In a case where the loaded sub battery 12S is used up, the sub battery 12S is detached from the battery loading portion 81B, and a new fully charged sub battery 12S is loaded on the battery loading portion 81B. Also in the second example embodiment, similarly to the first example embodiment, a power supply cable 61B and a communication cable 61C are provided, the tractor 2 and the sub battery 12S are connected by the power supply cable 61B, and the tractor 2 and the spreading device 3 are connected by the communication cable 61C. The power supply cable 61B and the communication cable 61C are connected to a connector 61 provided in the tractor 2.

In this manner, the sub battery 12S is loaded on the towed trailer 80 without being loaded on the tractor 2. A loading space of the towed trailer 80 can be dedicated to loading the sub battery 12S, and more batteries can be loaded as compared with the first example embodiment. In addition, even when heat generation from the sub battery 12S increases due to a large degree of discharge of the sub battery 12S or the like, the frame 81 can be used as a heat sink via the battery loading portion 81B made of a metal material.

In the present example embodiment, only one towed trailer 80 is coupled to a rear side of the tractor 2, but instead, a plurality of towed trailers 80 may be coupled to the rear side of the tractor 2 so as to be continuous. In this case, the sub battery 12S may be loaded on each of the plurality of towed trailers 80. In addition to being loaded on the towed trailer 80, the sub battery 12S may also be loaded on the spreading device 3.

As described above, the working machines according to the example embodiments of the present invention may each include the traveling vehicle 2 as the first moving entity, the working device 3 (and the towed trailer 80) as the second moving entity coupled to the first moving entity, and the sub battery 12S that is loaded on the second moving entity and stores the energy source to drive the traveling vehicle 2. With this configuration, the sub battery 12S is loaded on the working device 3 and/or the towed trailer 80 without being loaded on the traveling vehicle 2. Therefore, it is not necessary to newly provide a configuration to load the sub battery 12S on the traveling vehicle 2, and the sub battery 12S can be easily loaded. In a case where the traveling vehicle 2 includes the main battery 12M, the traveling and work can be continued according to the capacity of the sub battery 12S without being stopped in order to charge the main battery 12M having a remaining charge level that has decreased. Therefore, as many sub batteries 12M that store the energy source can be loaded on the working machine 1 as possible and appropriately, and stoppage of traveling and work related to charging of the main battery 12M can be reduced or minimized.

In the working machine 1 according to the first example embodiment, in particular, the second moving entity includes the working device 3 that performs the work, and the sub battery 12S is loaded on the working device 3. Accordingly, the sub battery 12S can be loaded by effectively using the space of the working device 3 without being loaded on the traveling vehicle 2, and it is possible to reduce or prevent an increase in size of the entire working machine. In addition, a loading position of the sub battery 12S can be brought close to the center of gravity, and a weight balance of the entire working machine can be prevented from being lost.

In the working machine 1 according to the second example embodiment, in particular, the second moving entity includes the working device 3 that performs the work, and the sub battery 12S is coupled to the working device 3 by being loaded on the towed trailer 80. With this configuration, the loading space of the towed trailer 80 can be dedicated to loading the sub battery 12S, and more batteries can be loaded.

In particular, in a working machine according to an example embodiment includes the power supply cable 61B which is a path of the electric energy supplied from the sub battery 12S to the traveling vehicle 2, and the connector 61 that can connect and disconnect the power supply cable 61B, the connector 61 allowing supply of the electric energy when connected, and cutting off supply of the electric energy when disconnected. With this configuration, the length and the routing of the power supply cable 61B can be adjusted to give a degree of freedom to the loading position of the sub battery 12S. In addition, the sub battery 12S is loaded on the working device 3 or the towed trailer 80 in advance, and the connector 61 is connected at the time of coupling, or the sub battery 12S is loaded on the coupled working device 3 or the towed trailer 80 later and the connector 61 is connected, so that it is possible to give a degree of freedom to a process of loading the sub battery 12S.

In a working machine according to an example embodiment, in particular, the connector 61 is provided in the traveling vehicle 2 so as to face the second moving entity coupled to the traveling vehicle 2. Specifically, the connector 61 is provided at the rear portion of the tractor 2, and is located above the front end portion of the top link 6B1 of the coupling device 6 and the front end portion of the lift arm 6A. With this configuration, the connector 61 can be brought close to the sub battery 12S, and a necessary distance of the power supply cable 61B can be shortened. As a result, the routing of the power supply cable 61B is facilitated. Furthermore, a conduction resistance of the power supply cable 61B can be reduced. In a case where the coupling device 6 is provided at the rear portion of the tractor 2, the connector 61 is disposed above the coupling device 6, so that interference between the coupling device 6 and the power supply cable 61B can be reduced or prevented.

In particular, in a working machine according to an example embodiment, the storage is the sub battery 12S capable of charging and discharging the electric energy as the energy source, the working device 3 is capable of receiving a signal from the traveling vehicle 2, and the working machine 1 includes the communication cable 61C that transmits the signal from the traveling vehicle 2 toward the working device 3, and the connector 61 that is capable of connecting and disconnecting each of the power supply cable 61B and the communication cable 61C, allows supply of the electric energy and transmission of the signal when connected, and cuts off supply of the electric energy and transmission of the signal when disconnected. With this configuration, a communication connector can be effectively used and integrated with a power supply connector, and the power supply cable 61B and the communication cable 61C can be connected and disconnected with one connector 61. Therefore, an effort for connector connection can be reduced, and the number of components can also be reduced. In addition, the power supply cable 61B and the communication cable 61C can also be integrated by binding or the like, so that an effort of the routing can be reduced as compared with a case of separately routing the power supply cable 61B and the communication cable 61C.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a first moving entity;
a second moving entity coupled to the first moving entity; and
a storage loaded on the second moving entity to store an energy source to drive the first moving entity; wherein
the second moving entity includes a working device to perform work; and
the storage is loaded on the working device.

2. The working machine according to claim 1, further comprising:
a supply path that is a path of the energy source supplied from the storage to the first moving entity; and
a connector to connect and disconnect the supply path, allow supply of the energy source when connected, and cut off supply of the energy source when disconnected.

3. The working machine according to claim 2, wherein the connector in the first moving entity faces the second moving entity coupled to the first moving entity.

4. The working machine according to claim 3, wherein
the storage includes a battery to charge and discharge electric energy as the energy source;
the working device is capable of receiving a signal from the first moving entity; and
the working machine further comprises:
a communication path to transmit the signal from the first moving entity toward the working device; and
the connector is operable to connect and disconnect the supply path and the communication path, allow supply of the electric energy and transmission of the signal when connected, and cut off supply of the electric energy and transmission of the signal when disconnected.

5. The working machine according to claim 2, wherein
the storage includes a battery that charges and discharges electric energy as the energy source;
the working device is capable of receiving a signal from the first moving entity; and
the working machine further comprises:
a communication path to transmit the signal from the first moving entity toward the working device; and
the connector is operable to connect and disconnect the supply path and the communication path, allow supply of the electric energy and transmission of the signal when connected, and cut off supply of the electric energy and transmission of the signal when disconnected.

6. A working machine comprising:
a first moving entity;
a second moving entity coupled to the first moving entity; and
a storage loaded on the second moving entity to store an energy source to drive the first moving entity; wherein
the second moving entity includes a working device to perform work; and
the storage is coupled to the working device.

* * * * *